United States Patent Office 2,840,211
Patented June 24, 1958

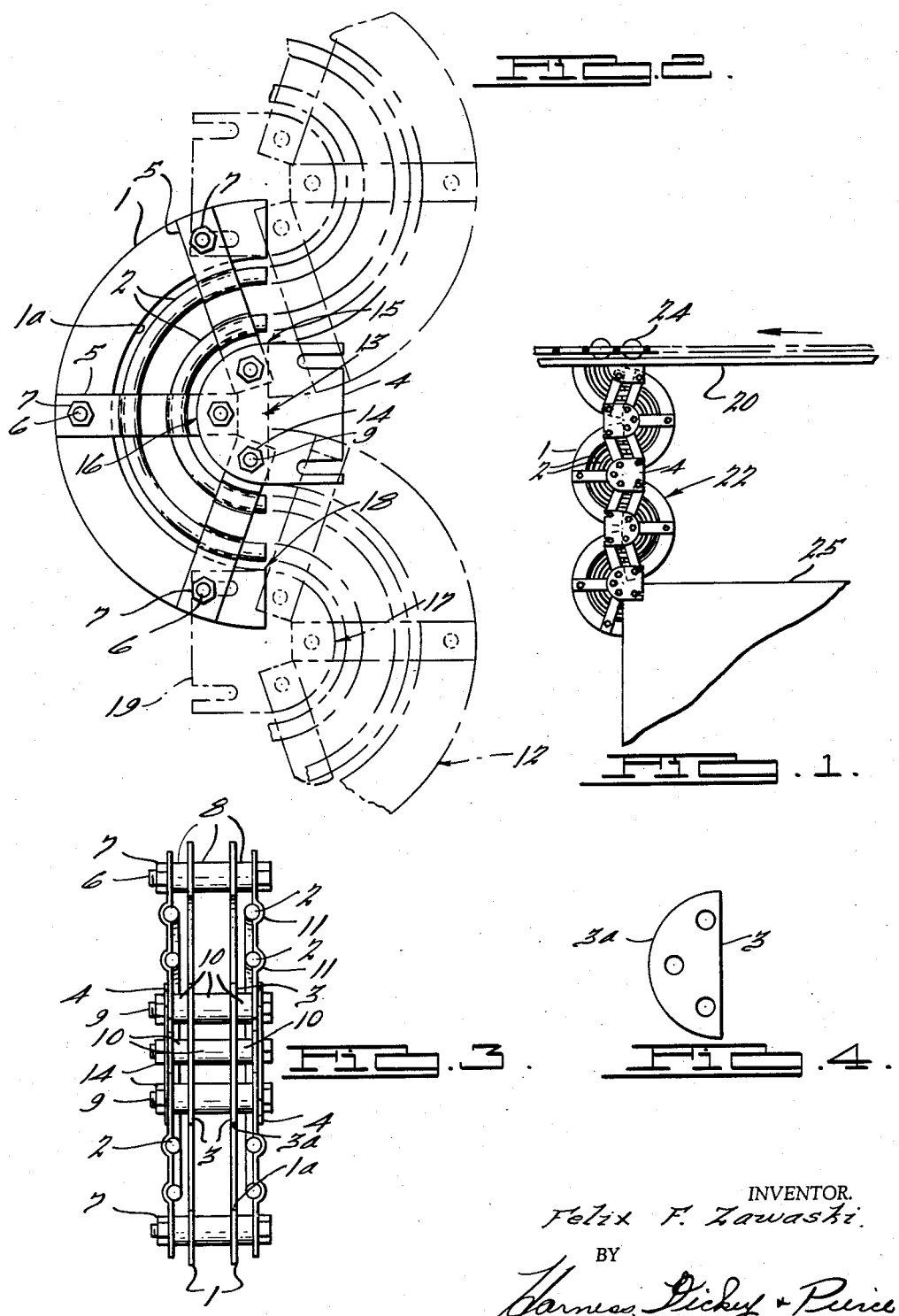

2,840,211

DROP TRACK CONSTRUCTION

Felix F. Zawaski, Dearborn Township, Wayne County, Mich., assignor to Michigan Tool Company, Detroit, Mich., a corporation of Delaware Application October 18, 1956, Serial No. 616,797

1 Claim. (Cl. 193—27)

The present invention relates to a gravity-type drop track assembly for conveying articles to a machine, and more particularly to an improved track assembly for feeding gear workpieces to a machine by means of a gravity drop without damaging the gear workpieces.

Automation in the gear field today is becoming increasingly more important, one advantage being that it permits continuous production of gears from blank to finished gear without manual handling of the workpieces. In an automated line, it is often desirable to convey the workpieces from one machining stage to the next through the agency of an overhead conveyor, and to drop the workpieces from the overhead conveyor to a work point, such as a machine, by means of a chute or track. Heretofore, prior gravity feed chutes or tracks have presented a troublesome problem in automated lines since the workpieces were often damaged by the drop.

The present invention overcomes this problem by controlling the rate of descent of the gear workpieces during their travel from the overhead conveyor to the machine. In general, in the embodiment of the invention illustrated, the drop track is comprised of a plurality of tracks having curvilinear guide surfaces connected in a zig-zag, generally vertical array so that the gear workpieces may roll from one curvilinear segment successively into oppositely directed segments while traveling in a progressively downward direction. During the progressive downward movement of the workpieces, the horizontal component of the direction of movement of each of the gear workpieces is periodically reversed, and the direction of rotation of each of the workpieces is also reversed. The net result of the rolling-sliding friction of the gear workpieces with a periodic change in the direction of their rotation, is a controlled relatively slow rate of descent which substantially prevents damage to the workpiece.

It is an object of this invention to overcome disadvantages in prior drop tracks of the indicated character and to provide an improved gravity-type drop track incorporating improved means for preventing damage to gears, or other workpieces, fed to a machine by means of the gravity-type drop track.

It is another object of the present invention to provide an improved gravity-type drop track incorporating improved means for controlling the rate of descent of gears, or other workpieces, therethrough.

Other objects and features of novelty of the invention will become apparent from the following description, the appended claim and the accompanying drawing, wherein:

Figure 1 is an elevational view of a drop track embodying the present invention, showing the same in installed relationship between an overhead conveyor and a fragmentarily illustrated machine;

Fig. 2 is an enlarged side elevational view of a portion of the drop track assembly illustrated in Fig. 1;

Fig. 3 is an end view of the track construction illustrated in Fig. 2; and

Fig. 4 is a detailed side view of an inner rail element.

Referring to the drawing, and more particularly to Fig. 1 thereof, a drop track 22 is shown in installed relationship between an overhead conveyor 20 and a fragmentarily illustrated gear hobbing machine 25 whereby gear blanks 24 may be gravity fed through the drop track from the conveyor to the machine. As shown in Figs. 2 and 3, the drop track 22 includes a plurality of oppositely directed segments, each composed of a pair of outer rails 1 having semi-circular guide surfaces 1a. The rails are mounted on studs 6 and held in spaced relation by spacers 8. Inner rails 3 having semi-circular guide surfaces 3a are provided, the inner rails 3 being mounted on studs 9 and held in spaced relation by spacers 10. Straps 5 connect the studs 6 and 9 so as to fix the inner rails 3 and outer rails 1 in a concentric manner with a pair of each preferably in the same plane. End guides 2 are provided which are welded within annular grooves 11 on the straps 5. In the embodiment of the invention illustrated, the guide surfaces of each of the guides 2, inner rails 3, and outer rails 4 are substantially semi-circular in elevational view and have their centers of curvature located on the same horizontal axis 13 disposed in a vertical plane which passes through the longitudinal axis of the track assembly 22. Each semi-circular segment of the track assembly 22 includes a pair of brackets 4, which are also mounted on the studs 9 and which project therefrom to permit the mating of adjacent semi-circular segments. In Fig. 2, a portion of a second semi-circular segment 12 of the drop track 22 is shown in dotted lines, the semi-circular segments of the track 22 being connected by means of brackets 4 and 19. It will be understood that a plurality of segments may be multiplied in a similar manner to obtain a drop track of any desired length.

Fig. 3 is an end view of Fig. 2 and clearly illustrates the spacial relation of the inner rails 3, the outer rails 1, the straps 5, and the brackets 4.

As shown in Fig. 4, the inner rail 3 is substantially semi-circular in side elevational view, the center of curvature of the guide surfaces of each rail 3 being disposed in a vertical plane which passes through the longitudinal axis of the track assembly when the inner rail 3 is assembled therein.

In operation, gear workpieces may be introduced into the drop track assembly 22 so that the workpieces are disposed between the end guides 2, the inner rails 3 and the outer rails 1, the rate of descent of the workpieces along the drop track being limited by both rolling and sliding friction. As each workpiece descends from point 15 to 16 on the curved guide surfaces of the inner member 3, the workpiece tends to roll on the inner rails 3 and rotate in a counterclockwise direction as viewed in Fig. 2. As each workpiece passes the point 16, the horizontal component of motion is reversed with the result that the direction of rotation is also reversed and the workpiece tends to rotate in a clockwise direction. This reversal of the direction of rotation will take place as each workpiece passes the point 16, and the direction of rotation of each workpiece will again reverse as each workpiece passes the point 17 on the segment 12, the point 17 being the point at which the horizontal component of motion of the workpiece is reversed. Thus, the reversal of rotation will take place when the gear blanks cease moving from right to left and begin moving from left to right and vice versa. At point 18 the gear blank rolls smoothly over the junction of the outer rails 1 with the inner rails 19 of the segment 12. However, the direction of rotation of the gear blanks as well as the horizontal component of their direction remains the same.

From the above description it will be apparent that a drop track construction embodying the present invention provides a controlled rate of descent of the gear blanks from the point of their introduction at the top of the drop track to the end of their drop, the reversal of direction of rotation of the gear blanks reducing the speed of their descent so that they travel at a relatively slow rate.

While a preferred embodiment of the invention has been shown and described, it will be understood that various changes and modifications may be made without departing from the spirit of the invention.

What is claimed is:

A drop track for gravity feeding workpieces to a machine comprising a plurality of pairs of outer rails having generally semi-circular guide surfaces, a plurality of pairs of inner rails having generally semi-circular guide surfaces of smaller radius than the guide surfaces on said outer rails, generally semi-circular guides having radii intermediate the radii of said inner and outer rails, means for connecting said rails and said guides to define a generally semi-circular track assembly, and means connecting a plurality of said track assemblies in successively oppositely directed relationship to form a guideway, the slope of which changes constantly and is reversed at spaced points.

References Cited in the file of this patent

UNITED STATES PATENTS

| | | |
|---|---|---|
| 293,898 | Martin | Feb. 19, 1884 |
| 599,205 | Vause | Feb. 15, 1898 |
| 662,546 | Puddefoot | Nov. 27, 1900 |
| 848,868 | Trama | Apr. 2, 1907 |
| 951,323 | Mathewson | Mar. 8, 1910 |